UNITED STATES PATENT OFFICE.

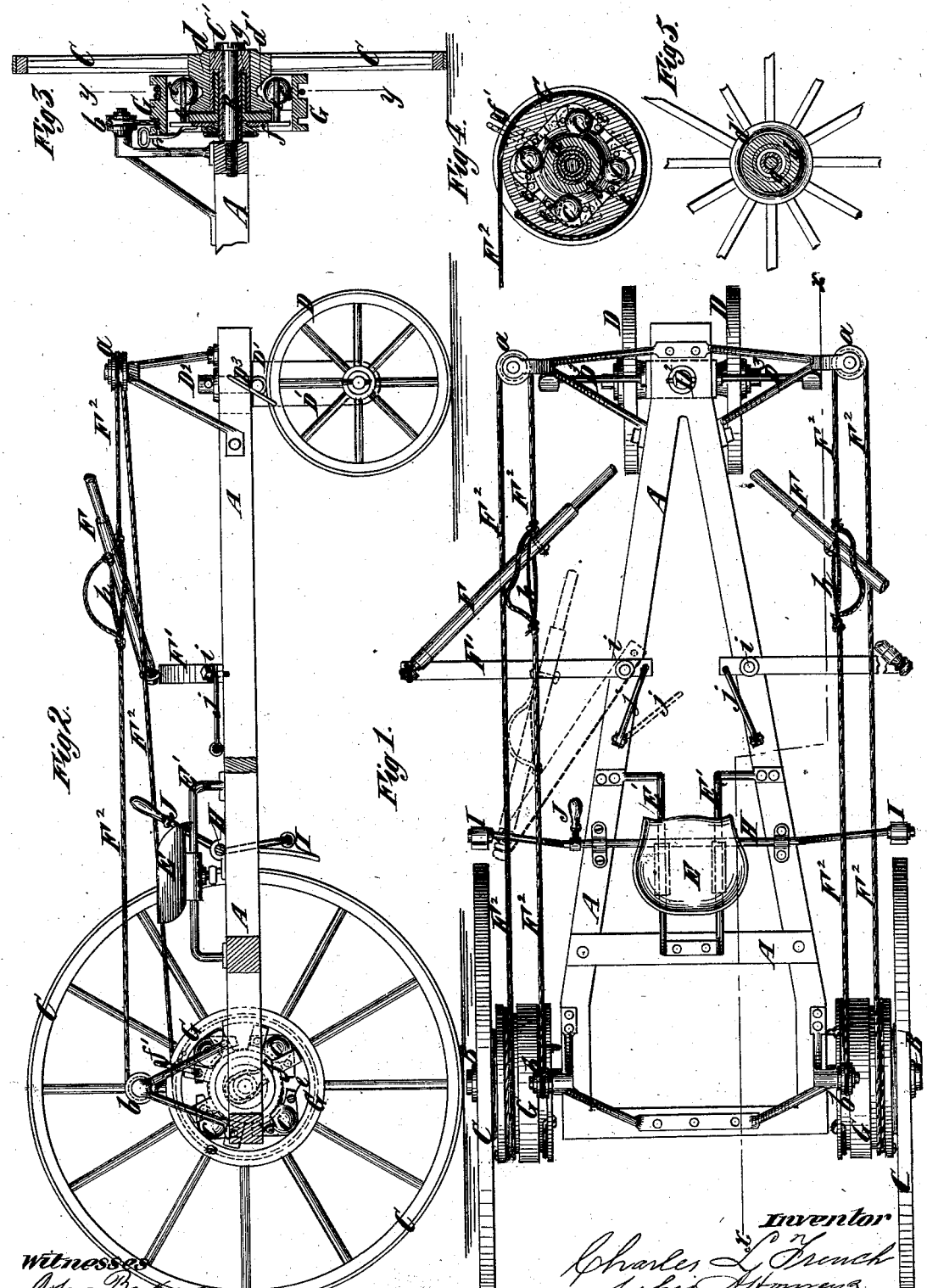

CHARLES L. FRENCH, OF NEW YORK, N. Y.

ROWING-WAGON.

SPECIFICATION forming part of Letters Patent No. 224,415, dated February 10, 1880.

Application filed November 17, 1879.

*To all whom it may concern:*

Be it known that I, CHARLES L. FRENCH, of the city of New York, in the county and State of New York, have invented certain new and useful Improvements in Rowing-Wagons, of which the following is a description.

My invention consists in a wagon adapted to be propelled by hand, and in which the propelling-power is applied, preferably, to two or more horizontally-arranged oar-like levers pivoted at or near one end, and having cords or other flexible connections passing from them over drums on the axle. Such drums are connected with the wheels by means of clutches, which release the drums, so that they rotate freely while the levers or oars are on the return stroke, and such clutches are preferably so constructed that they may be adjusted to lock the said drums to the wheels when rotating in either direction, so as to move the wagon backward or forward.

It also consists in various novel combinations of parts and details of construction, to be hereinafter explained.

In the accompanying drawings, Figure 1 represents a plan of a rowing-wagon embodying my invention. Fig. 2 represents an irregular longitudinal section thereof on the line $x$ $x$, Fig. 1. Fig. 3 represents a longitudinal section through one of the wheels, clutches, and axle-boxes. Fig. 4 represents a transverse section of one of the said clutches on the dotted line $y\ y$, Fig. 3; and Fig. 5 represents a similar section through the hub of the wheel.

Similar letters of reference designate corresponding parts in all the figures.

A designates the frame-work of the wagon, and B the axles, which are here shown as formed by two bolts screwed into the frame, but which would, in practice, consist of a single axle extending across the wagon.

C designates the main wheels of the wagon, to which power is applied, and which are mounted loosely on the axles B; and D represents two leading-wheels, which are arranged near together at the front of the wagon. The wheels D are mounted in a frame, $D'$, which is pivoted at $D^2$ to the frame A of the wagon, so that it may be swiveled to steer the wagon. From this frame-work $D'$ rods or arms $D^3$ project at each side, and upon which the feet of the operator are placed. By swiveling the frame $D'$ the wagon may be steered in any direction.

E designates the seat of the operator, which is preferably made to slide along guides $E'$, so as to simulate the action of a rower's seat in a boat.

Arranged in convenient position to be readily reached from the seat are two oar-like levers, F, pivoted at or near one end to outriggers $F'$, and connected by cords $F^2$ or other flexible connections with drums G, arranged to rotate loosely on the axles B, but adapted to be connected to the wheels C by means of clutches, hereinafter to be explained.

One part of the cords or flexible connections $F^2$ passes from the levers F over guide-pulleys $a$, and thence are wound around the drums G, the latter being grooved for that purpose. The other parts of the said cords pass from the levers F over the guide-pulleys $b$, and are thence wound around the drums G in the opposite direction to the first-described parts of the cords. When the cords $F^2$ are thus arranged the drums G are rotated first forward and then back as the levers F are operated.

If desirable, vertically-arranged levers, or one or more handles, might be substituted for the levers F.

In order to permit the drums to rotate loosely upon the axles without actuating the wheels C as the levers F are moved forward for a new stroke, I connect said drums with the said wheels by means of clutches, which lock the drums to the wheels while moving in one direction. These clutches are formed by arranging a series of balls, $c$, preferably of semi-elastic material, between the inner surface of the drums G and the hubs $d$ of the wheels C. The hubs $d$ are here shown as provided with annular circumferential grooves $d'$, in which the said balls rest, and the said grooves may also have at their bottoms smaller grooves, which enable the balls to bite more firmly upon the hubs of the wheels. The drums G are divided with an approximately rectangular opening at the center, as clearly represented in Fig. 4, and as said drums are rotated the balls are caught between the sides of said opening and the hub of the wheel, and serve to impart to the latter the movement of the drum.

The sides of said opening may be either straight, as shown in Fig. 4, or curved, and may be also grooved. Instead of being rectangular, it may be of other polygonal form.

In order to enable the wagon to be moved either backward or forward, the balls $c$ are held in place by fingers or projections $e$, arranged in pairs, and extending one upon each side of each ball. These pins are all attached to a spider or frame, $f$, which is adapted to be oscillated on the face of the drum G, and is provided with a handle, $f'$, which is preferably elastic, for conveniently oscillating it. By oscillating the spider or frame $f$, and with it its attached fingers or projections $e$, the balls $c$ may be moved over so that they will act, when the drums are rotated in the reverse direction, so as to back the wagon, or they be moved into an intermediate position, so that the drums may be rotated free of the wheels in either direction.

As here represented, the axle-boxes $C'$ of the wheels C are provided with a deep annular recess, $g$, and the drums G have extending from them a sleeve, which enters said recess and affords a long bearing for the drum. When the balls $c$ are made of material that possesses a certain amount of elasticity, such as hard rubber, they bite more firmly upon the hubs of the wheels and prevent slipping.

As the cords $F^2$ are rigidly connected to the levers F, they are deflected from a straight line as the levers are oscillated, and in order to prevent any injurious strain upon the cords they are represented as having inserted in them a piece of elastic cord, $h$, to make an elastic connection, and the cord $F^2$ is preferably gathered up so that it will be extended and take the strain before the limit of elasticity of the elastic connection $h$ is reached.

As here represented, the outriggers $F'$ are pivoted to the frame of the wagon at $i$, and when it is desired to house the wagon the said outriggers may be swung inward, as shown in dotted outline in Fig. 1. When extended for rowing the outriggers are held rigidly by means of hooks $j$, which are disengaged therefrom when the outriggers are to be moved inward.

H designates a brake-shaft extending transversely across the wagon, and provided at each end with a brake-shoe, I, which, by the oscillation of said shaft, may be brought against the wheels C.

J designates a handle, arranged in proximity to the seat E.

If desired, two or more pairs of rowing-levers, F, might be used, connected to the same cords or connections $F^2$.

As the movement of the rowing-levers is very nearly analogous to the use of oars in a boat, this wagon may be used as a means of exercise, and it affords a convenient means of conveyance from place to place.

What I claim as my invention, and desire to secure by Letters Patent, is—

1. The combination, with the cord or other connection, $F^2$, of an elastic connection, $h$, inserted therein, the said cord being loose or gathered between the oar and said elastic connection, substantially as and for the purpose specified.

2. In a rowing-wagon, the combination, with the levers F, of the outriggers $F'$, pivoted at or near one end, and the hooks $j$, for keeping said outriggers in an extended position, and adapted to be removed to permit the folding inward of said outriggers, substantially as specified.

3. In a rowing-wagon, the combination of the drums mounted loosely on the axles, cords wound upon the said drums in opposite directions, and adapted to turn the said drums back and forth in opposite directions, wheels provided with hubs extending within the said drums, and rollers or balls arranged between said drums and hubs to produce the rotation of the wheels in either direction, substantially as specified.

4. In a rowing-wagon, the combination of the drum G, having cords $F^2$ or other connections wound upon it in opposite directions and adapted to rotate it in either direction, the hubs $d$, extending within the drums, the balls $c$, arranged between the drums and the hubs, and the oscillating spider or frame $f$ and its arms or projections $e$, for adjusting the position of such balls, substantially as specified.

5. The combination, with the drum G, the wheel-hub $d$, and the balls $c$, arranged between the drum and hub, of the axle-box $C'$, having an annular groove, $g$, and the sleeve extending from said drum and fitting within said groove, substantially as specified.

6. The combination, with the drum G, of the wheel-hub $d$, having the circumferential groove $d'$ and the smaller groove at the bottom of said groove $d'$, and the balls $c$, arranged to rotate in said groove, substantially as specified.

CHARLES L. FRENCH.

Witnesses:
AUSTIN D. MIDDLETON,
FREDK. HAYNES.